United States Patent
Liu

(10) Patent No.: US 8,589,906 B2
(45) Date of Patent: Nov. 19, 2013

(54) SOFTWARE UPDATE METHOD FOR DISPLAY DEVICE

(75) Inventor: Wei Liu, Wuhan (CN)

(73) Assignee: TPV Display Technology (Wuhan) Co., Ltd, Wuhan (CN)

( * ) Notice: Subject to any disclaimer, the term of this patent is extended or adjusted under 35 U.S.C. 154(b) by 188 days.

(21) Appl. No.: 13/198,803

(22) Filed: Aug. 5, 2011

(65) Prior Publication Data

US 2013/0036411 A1 Feb. 7, 2013

(51) Int. Cl.
*G06F 9/445* (2006.01)

(52) U.S. Cl.
USPC .......................... 717/170; 717/177

(58) Field of Classification Search
USPC .................................. 717/168–178
See application file for complete search history.

(56) References Cited

U.S. PATENT DOCUMENTS

2009/0119657 A1* 5/2009 Link, II .......................... 717/171

* cited by examiner

*Primary Examiner* — Chuck Kendall
(74) *Attorney, Agent, or Firm* — Alan Kamrath; Kamrath IP Lawfirm, P.A.

(57) ABSTRACT

A software update method for a display device includes: storing a first software program by a first memory of a computer device; electrically coupling the computer device to the display device; controlling a display card of the computer device by a public application programming interface (API) function of a driver program of the display card or by a physical address of the display card searched by a search program coded by an operating system of the computer device; transferring the first software program stored in the first memory to the display device through a display data channel (DDC) of the controlled display card; and, receiving the first software program by the display device and updating a second software program stored in a second memory of the display device into the first software program by a microcontroller of the display device.

14 Claims, 3 Drawing Sheets

SOFTWARE UPDATE METHOD FOR DISPLAY DEVICE

BACKGROUND OF THE INVENTION

1. Field of the Invention

The present invention relates to a software update method and, more particularly, to a software update method for a display device.

2. Description of the Related Art

As technology advances, various small, thin, lightweight, power saving and portable smart information appliances such as mobile phones, personal digital assistants (PDAs) or notebook computers have been widely used in our daily life, and display devices disposed therein play a very important role as human-machine interfaces. The display device requires a software program installed therein to control the operation of the display device. In the design of the display device, the designer must code and test the software program for the display device repeatedly to obtain a release version of the software program which can control the operation of the display device. Even after the display device is sold in the market, the designer may further provide one or more update versions of the software program to add new functions or to solve compatibility problems to improve the usability or performance of the display device.

Traditionally, the update of the software program installed in the display device needs to use a burning device electrically coupled between a computer device and the display device to transfer the update version of the software program stored in the computer device to replace or patch the old release version of the software program installed in the display device. When a user finds that the display device cannot work well or wants to add new functions to the display device, owing to no burning device, the user cannot perform the update of the software program of the display device by himself or herself. Accordingly, the user has to send the display device to the manufacturer or service station so that it not only increases the service cost of the manufacturer but also makes the user inconvenient. Moreover, the burning device is more complex in operations and requires constant maintenance.

Furthermore, when the computer device updates the software program of the display device, the computer device should be electrically coupled to another display device such as a computer monitor to assist in displaying the update process of the software program of the computer device to increase the complexity and inconvenience in updating the software program. Therefore, there is a need for a display device whereby the user can perform the update of the software program of the display device by himself or herself, and the complexity in updating the software program of the display device can be reduced.

SUMMARY OF THE INVENTION

The present invention is directed to providing a software update method for a display device whereby a user can perform the update of a software program of the display device by himself or herself without using a burning device.

According to one aspect of the present invention, there is provided a software update method for a display device. The software update method includes: storing a first software program by a first memory of a computer device; electrically coupling the computer device to the display device; controlling a display card of the computer device by a public application programming interface (API) function of a driver program of the display card or by a physical address of the display card searched by a search program coded by an operating system of the computer device; transferring the first software program stored in the first memory to the display device through a display data channel (DDC) of the controlled display card; and, receiving the first software program by the display device and updating a second software program stored in a second memory of the display device into the first software program by a microcontroller of the display device.

In the software update method of the present invention, the software update method may further include reminding that the display device has already updated the second software program into the first software program by the display device, for example, by using an on-screen display (OSD) to display a reminding image on a screen of the display device.

In the software update method of the present invention, the first memory may be a flash memory, a hard disk or an electrically erasable programmable read-only memory (EEPROM). The second memory may be a flash memory or an electrically erasable programmable read-only memory (EEPROM).

Accordingly, the present invention allows the user to perform the update of the software program of the display device by the display card of the computer device without using the burning device, and reminds the user whether the update is successful on the screen of the display device during the update of the software program of the display device.

BRIEF DESCRIPTION OF THE DRAWINGS

The foregoing and other features of the disclosure will be apparent and easily understood from a further reading of the specification and claims and by reference to the accompanying drawings in which:

DETAILED DESCRIPTION OF THE INVENTION

Figure 1:
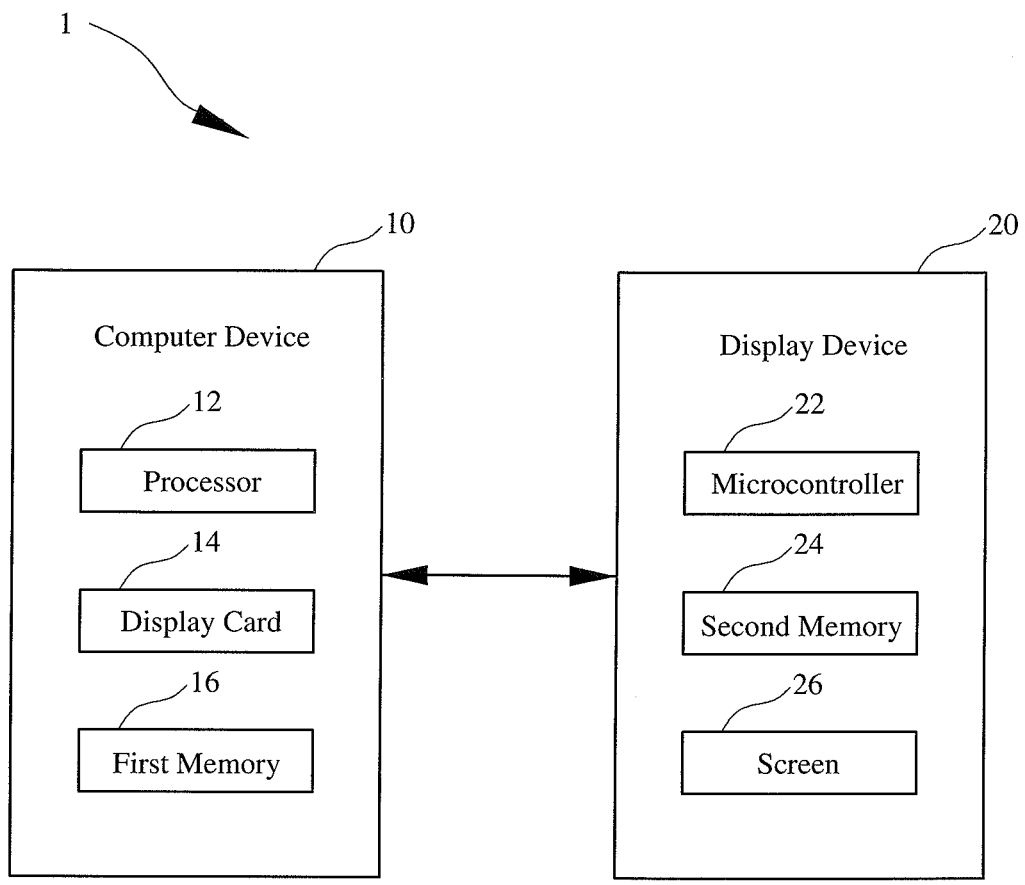
FIG. 1 is a functional block diagram of a software update system for a display device according to an embodiment of the present invention.

FIG. 1 is a functional block diagram of a software update system for a display device according to an embodiment of the present invention. Referring to FIG. 1, a software update system 1 includes a computer device 10 and a display device 20. The computer device 10 includes a processor 12, a display card 14 and a first memory 16, and the first memory 16 stores a first software program. The display device 20 includes a microcontroller 22, a second memory 24 and a screen 26, and the second memory 24 stores a second software program. In one embodiment, the first memory 16 may be a flash memory, a hard disk or an electrically erasable programmable read-only memory (EEPROM). The second memory 24 may be a flash memory or an electrically erasable programmable read-only memory (EEPROM). The microcontroller 22 may be included in a scaler integrated circuit (IC).

After the computer device 10 is electrically coupled to the display device 20, the processor 12 controls the display card 14 to transfer the first software program stored in the first memory 16 to the display device 20 through a display data channel (DDC) of the controlled display card 14. The DDC is a serial communication interface based on an inter-integrated circuit (I2C) protocol that provides communication between a display device and a computer device (e.g. a display card of the computer device). When the display device 20 receives the first software program, the microcontroller 22 controls updating the second software program stored in the second memory 24 into the first software program. When the display device 20 updates the second software program stored in the second memory 24 into the first software program, the display device 20 uses an on-screen display (OSD) to display a reminding image on the screen 26 to remind that the display device has finished the update of the software program of the display device. That is, the display device has already updated the second software program stored in the second memory 24 into the first software program.

In addition, there are two approaches to controlling the display card 14 to transfer the first software program stored in the first memory 16 to the display device 20 through the DDC of the controlled display card 14. The first approach is to control the display card by a public application programming interface (API) function of a driver program of the display card, which is provided by the manufacturer of the display card. However, not every manufacturer provides the public API function. The second approach is to develop a specific-purpose driver program including a search program coded by the developer through an operating system of the computer device 10, in which the search program is used to search a physical address of the display card to control the display card. For instance, the developer may code the search program of the display card 14 through a driver development kit (DDK) provided by the Microsoft Windows operating system of the computer device 10. Then, the processor 12 may use the search program to link a device database of the operating system to recognize the display card 14 in accordance with a vendor identification (ID) and a device ID and get the physical address of the display card 14 by the API function of the DDK. In the configuration of the computer device, devices such as a display card, an audio card and a network card have physical addresses for the operating system to control these devices and access related data. Hence, the processor 12 applies the physical address of the display card 14 to control the display card 14 to read the first software program stored in the first memory 16 and transfer the stored first software program to the display device 20 through the DDC of the controlled display card 14.

Figure 2:
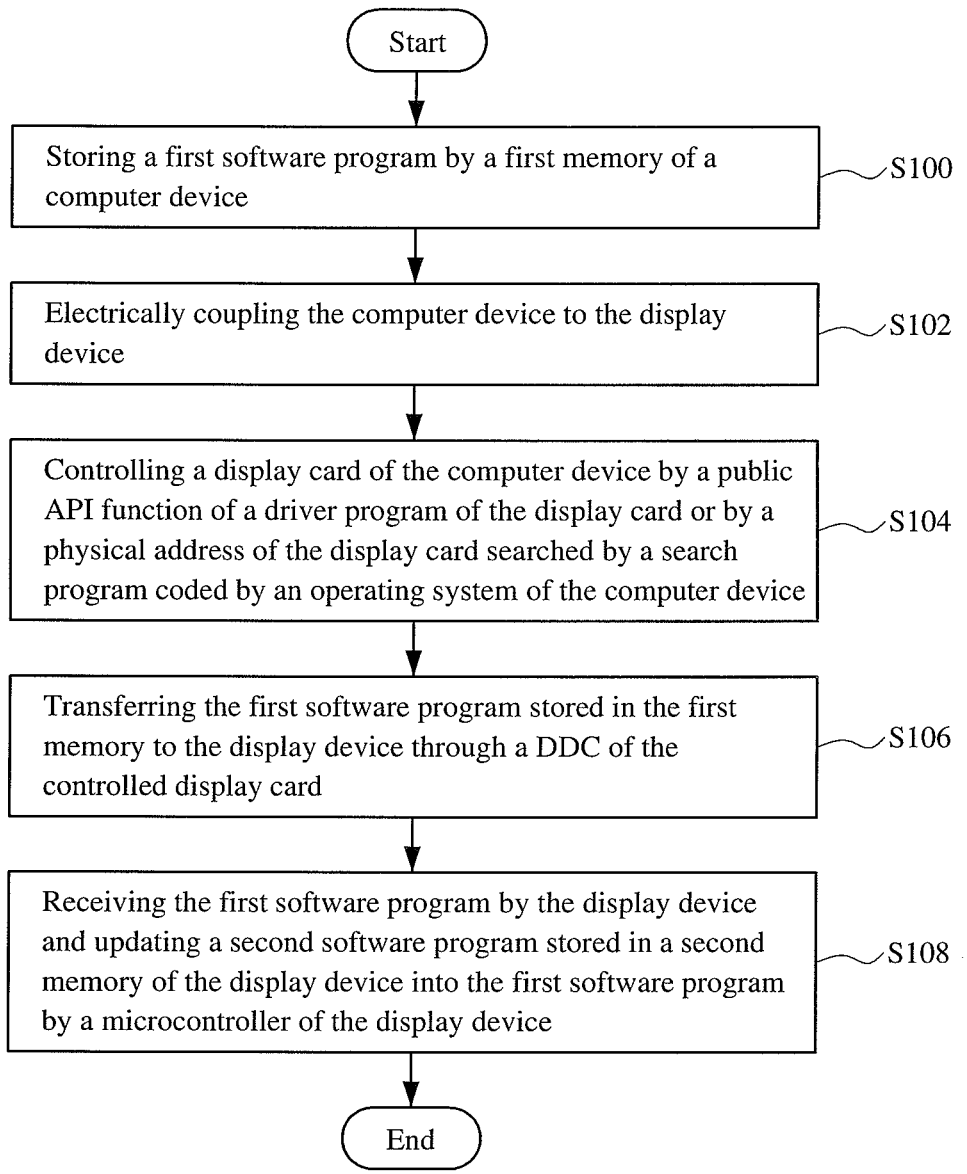
FIG. 2 is a flowchart of a software update method for a display device according to a first embodiment of the present invention.

FIG. 2 is a flowchart of a software update method for a display device according to a first embodiment of the present invention, in which the display device is, for example, the display device 20 shown in FIG. 1. Referring to FIGS. 1 and 2, a software update method for the display device 20 includes the following steps.

First, at the step S100, the first memory 16 of the computer device 10 stores the first software program.

Next, at the step S102, the computer device 10 is electrically coupled to the display device 20.

Next, at the step S104, the display card 14 may be controlled by the public API function of the driver program of the display card 14. The display card 14 may also be controlled by the physical address of the display card 14 searched by the search program coded by the operating system of the computer device 10.

Next, at the step S106, the display card 14 is controlled to transfer the first software program stored in the first memory 16 to the display device 20 through the DDC of the controlled display card 14.

Finally, at the step S108, the display device 20 receives the first software program, and, then, the microcontroller 22 of the display device 20 updates the second software program stored in the second memory 24 of the display device into the first software program.

Figure 3:
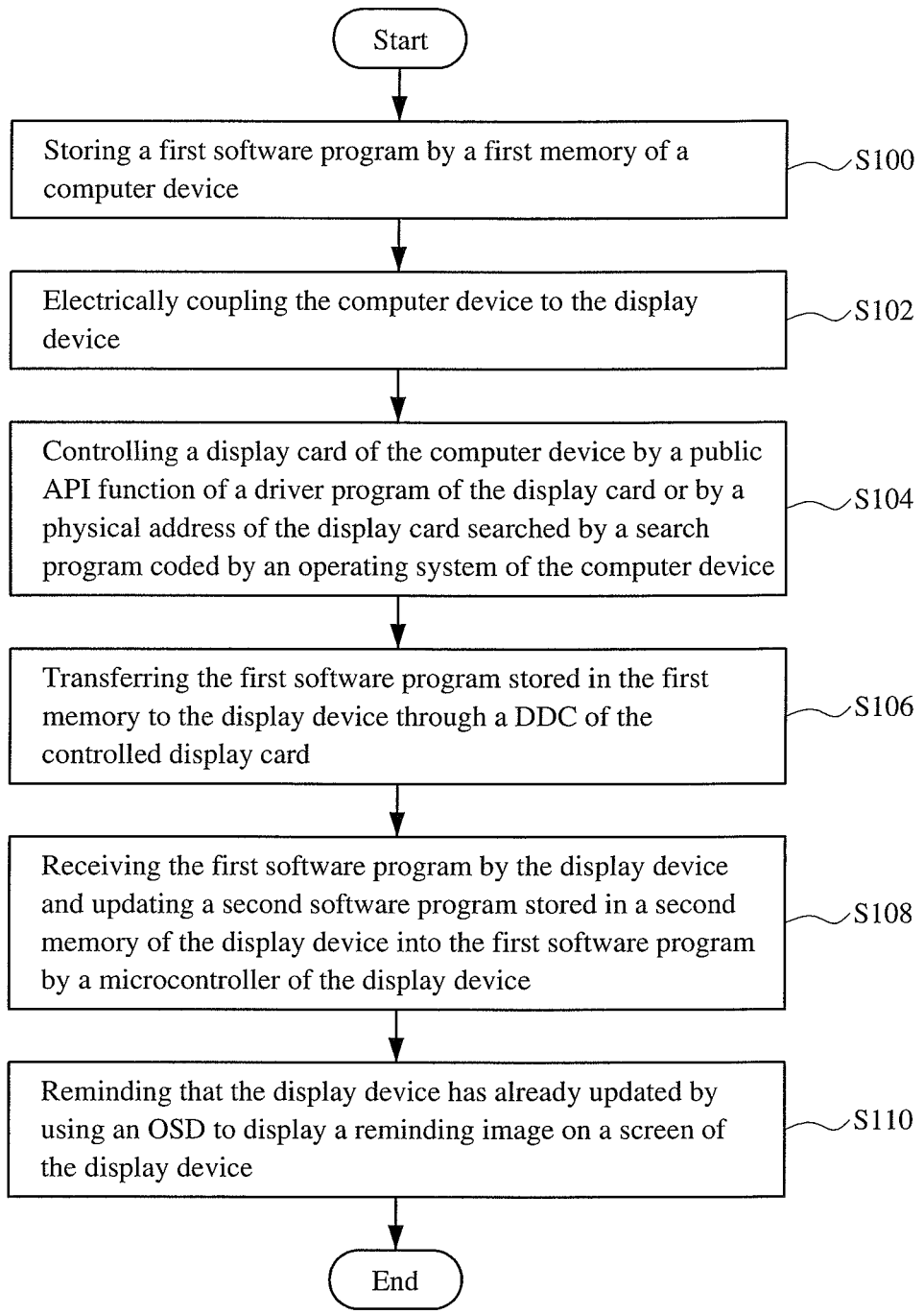
FIG. 3 is a flowchart of a software update method for a display device according to a second embodiment of the present invention.

FIG. 3 is a flowchart of a software update method for a display device according to a second embodiment of the present invention, in which the display device is, for example, the display device 20 shown in FIG. 1. Referring to FIGS. 1 and 3, compared to the software update method shown in FIG. 2, the software update method shown in FIG. 3 further includes a step S110 after the step S108.

At the step S110, the display device 20 reminds that the display device 20 has already updated the second software program stored in the second memory 24 into the first software program by using the OSD to display the reminding image on the screen 26 of the display device 20.

In summary, the present invention allows the user to perform the update of the software program of the display device by the display card of the computer device without using the burning device, and reminds the user whether the update is successful on the screen of the display device during the update of the software program of the display device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

I claim:

1. A software update method comprising:
    providing a computer device including a display card and a first memory, with the display card controlled by a driver program containing a public application programming interface (API) function;
    providing a display device including a microcontroller, a second memory and a screen;
    storing a first software program by the first memory of the computer device, with the first software program configured to run solely on the display device;
    electrically coupling the computer device to the display device;
    controlling the display card of the computer device by the API function of the driver program of the display card;
    transferring the first software program stored in the first memory to the display device through a display data channel (DDC); and
    receiving the first software program by the display device, running the first software program solely in the display device and updating a second software program stored in the second memory of the display device into the first software program by the microcontroller of the display device, with the second software program configured to run solely in the display device.

2. The software update method of claim 1, further comprising:
    reminding the display device has already updated the second software program into the first software program by the display device, with the first software program and second software program configured to run solely on the display device.

3. The software update method of claim 2, wherein reminding the display device comprises using an on-screen display (OSD) of the display device to display a reminding image on the screen of the display device.

4. The software update method of claim 1, wherein the first memory comprises a flash memory, a hard disk or an electrically erasable programmable read-only memory (EEPROM).

5. The software update method of claim 1, wherein the second memory comprises a flash memory or an electrically erasable programmable read-only memory (EEPROM).

6. The software update method of claim 1, further comprising:
storing the first software program in the first memory configured to have the second software program to be updated into the first software program to create an updated software program, with the updated software program configured to run solely on the display device.

7. The software update method of claim 1, further comprising:
storing the second software program in the second memory configured to be updated into the first software program to create an updated software program, with the updated software program configured to run solely on the display device.

8. A software update method comprising:
providing a computer device including a display card and a first memory, with the display card controlled by a specific-purpose driver program containing a search program coded by an operating system of the computer device;
providing a display device including a microcontroller, a second memory and a screen;
storing a first software program by the first memory of the computer device, with the first software program configured to run solely on the display device;
electrically coupling the computer device to the display device;
controlling the display card of the computer device by a physical address of the display card searched by the search program;
transferring the first software program stored in the first memory to the display device through a display data channel (DDC); and
receiving the first software program by the display device, running the first software program solely in the display device and updating a second software program stored in the second memory of the display device into the first software program by the microcontroller of the display device, with the second software program configured to run solely on the display device.

9. The software update method of claim 8, further comprising:
reminding the display device has already updated the second software program into the first software program by the display device, with the first software program and second software program configured to run solely in the display device.

10. The software update method of claim 9, wherein reminding the display device comprises using an on-screen display (OSD) of the display device to display a reminding image on the screen of the display device.

11. The software update method of claim 8, wherein the first memory comprises a flash memory, a hard disk or an electrically erasable programmable read-only memory (EEPROM).

12. The software update method of claim 8, wherein the second memory comprises a flash memory or an electrically erasable programmable read-only memory (EEPROM).

13. The software update method of claim 8, further comprising:
storing the first software program in the first memory configured to have the second software program to be updated into the first software program to create an updated software program, with the updated software program configured to run solely on the display device.

14. The software update method of claim 8, further comprising:
storing the second software program in the second memory configured to be updated into the first software program to create an updated software program, with the updated software program configured to run solely on the display device.

* * * * *